United States Patent [19]
Wilke

[11] 4,283,028
[45] Aug. 11, 1981

[54] ADJUSTABLE WEDGE FITTING FOR SHARING THE THRUST LOAD OF A JET ENGINE

[75] Inventor: William H. Wilke, Wichita, Kans.

[73] Assignee: The Boeing Company, Seattle, Wash.

[21] Appl. No.: 99,472

[22] Filed: Dec. 3, 1979

[51] Int. Cl.³ .............................................. B64D 27/16
[52] U.S. Cl. .................................... 244/54; 60/39.31; 248/555
[58] Field of Search .............. 244/54, 53 R; 248/544, 248/555; 60/39.31, 39.32, 226 R, 262

[56] References Cited

U.S. PATENT DOCUMENTS

| | | | |
|---|---|---|---|
| 1,836,319 | 12/1931 | Gehrung | 244/54 |
| 2,690,891 | 10/1954 | Henshaw | 248/555 |
| 3,217,490 | 11/1965 | Chilvers | 244/54 |
| 3,222,017 | 12/1965 | Bobo | 244/54 |
| 4,037,809 | 7/1977 | Legrand | 244/54 |

*Primary Examiner*—Galen L. Barefoot
*Attorney, Agent, or Firm*—Edwin H. Crabtree

[57] ABSTRACT

An adjustable wedge fitting for sharing the thrust load of a jet engine. The fitting adapted for mounting on an air frame strut and a fan duct cowl of a jet engine nacelle. By attaching and adjusting a plurality of the wedge fittings along the sides of the air frame strut and the fan duct cowl, forward and reverse thrust loads from the engine may be conveyed evenly from the cowling to the air frame strut.

5 Claims, 7 Drawing Figures

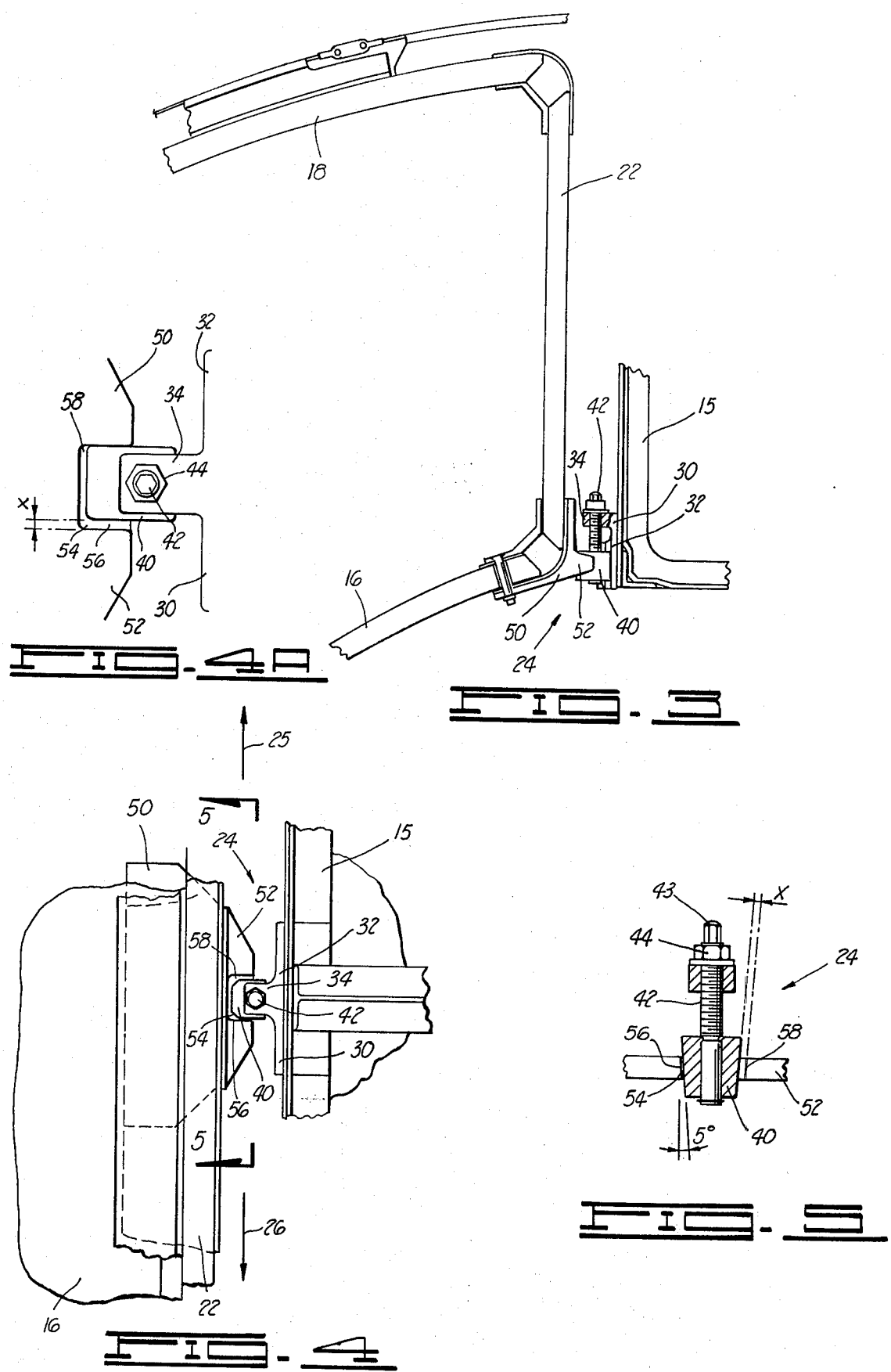

ADJUSTABLE WEDGE FITTING FOR SHARING THE THRUST LOAD OF A JET ENGINE

BACKGROUND OF THE INVENTION

This invention relates to fittings used for mounting a jet engine nacelle to an air frame strut and more particularly but not by way of limitation to an adjustable wedge fitting attached to the sides of a fan duct cowl for distributing thrust and reverse thrust loads from the jet engine to the air frame strut.

Heretofore, mounting turbo-fan jet engines onto an air frame structure such as air frame strut has resulted in highly concentrated loads at the engine mounts with resulting engine flexure which causes degraded performance.

Fan duct cowlings consist of two cowlings mounted onto the strut by hinges and disposed on opposite sides of the air frame strut. The cowlings are hinged so that they may be opened for ready access to the jet engine and engine accessories for providing maintenance thereon. The fan duct cowlings are closed into place fitting "V" grooves in an engine fan exhaust case. The cowlings are closed and latched together.

In U.S. Pat. No. 4,037,809 to Legrand et al, U.S. Pat. No. 3,222,017 to Bobo, U.S. Pat. No. 4,013,246 to Nightingale, U.S. Pat. No. 3,844,115 to Freid, U.S. Pat. No. 2,818,225 to Kent, U.S. Pat. No. 4,065,077 to Brooks, U.S. Pat. No. 3,541,794 to Johnson et al and U.S. Pat. No. 3,750,983 to Morris various aircraft engine mounting and attachments are disclosed.

None of the prior art engine nacelles described in these patents have provided for an adjustable wedge fitting as described herein for evenly distributing thrust loads and reverse thrust loads to the air frame strut.

SUMMARY OF THE INVENTION

The subject invention provides a unique adjustable wedge fitting for mounting on the sides of an air frame strut and fan duct cowls of an engine nacelle to evenly distribute thrust loads and reverse thrust loads from the jet engine to the air frame strut. A plurality of the fittings allows the forward and reverse thrust loads to be conveyed to the strut at several points and distributes the load over a large area thus allowing only vertical, side and torque loads to be carried by engine forward and aft mounts.

The wedge fitting when mounted on the fan duct cowl and the air frame strut may be adjusted for distributing either thrust loads or reverse thrust loads.

The fitting is further designed to release the cowl from the air frame strut when the cowl is raised on its hinges when providing maintenance on the engine and engine accessories.

The subject invention greatly reduces engine flexure by evenly distributing thrust loads into the air frame strut.

The adjustable wedge fitting for sharing thrust loads and reverse thrust loads from a jet engine include a bracket adapted for attaching the side of an air frame strut. A wedge is threadably attached to the bracket and is vertically adjustable thereon. A wedge receiver is adapted for attaching to the side of the fan duct cowl and includes a tapered groove integrally formed thereon. When the wedge is lowered vertically on the bracket it is received in the tapered groove of the wedge receiver for uniformly receiving and transferring forward thrust or reverse thrust loads from the fan duct cowl to the air frame strut.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 is a side view of adjustable fitting attached to the side of the air frame strut and fan duct cowl shown taken along line 3—3 shown in FIG. 2.

FIG. 4 is a top view of the adjustable wedge fitting.

FIG. 4A is an enlarged partial top view of the wedge fitting.

FIG. 5 is a sectional view of the wedge fitting taken along line 5—5 shown in FIG. 4.

DETAILED DESCRIPTION OF THE DRAWINGS

Figure 1:
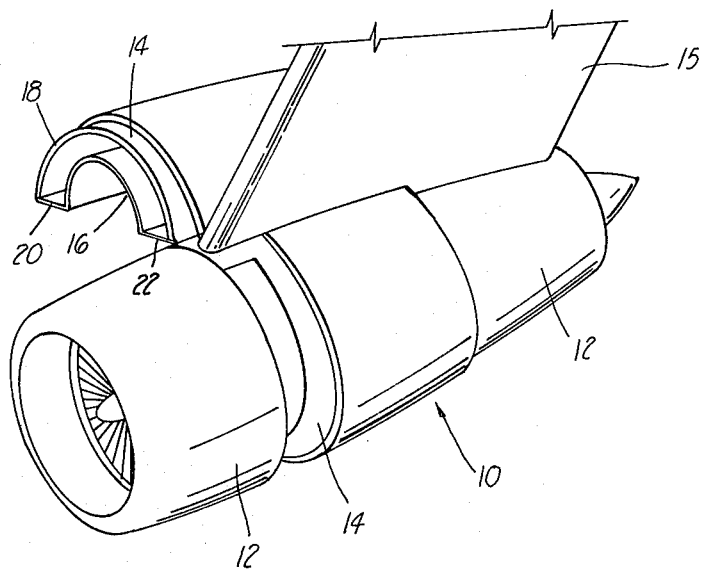
FIG. 1 illustrates a perspective view of a typical jet engine nacelle with a pair of fan duct cowls attached to the opposite sides of an air frame strut.

In FIG. 1, a perspective view of a jet engine 10, is illustrated having an engine nacelle 12, therearound. The engine nacelle 12 includes a pair of fan duct cowls 14. The cowls 14 are hinged to the side of an air frame strut 15. One of the fan duct cowls 14 is shown in an opened position to provide ready access to the engine and engine accessories for performing maintenance thereon. When the fan duct cowls 14 are closed, they are latched together. The fan duct cowl 14 includes an inner wall 16, an outer wall 18, an upper bifurcation wall 22 and a lower bifurcation wall 20. When the cowl 14 is in a closed position latched to the engine nacelle 12, the upper bifurcation wall 22 is disposed adjacent the side of the outer end of the air frame strut 15 and attached thereto.

The adjustable wedge fitting described herein is used for releaseably securing the upper bifurcation wall 22, inner wall 16 and outer wall 18 of the cowl 14 to the side of the air frame strut 15 and distributing evenly thrust loads from the engine 10 to the strut 15.

Figure 2:
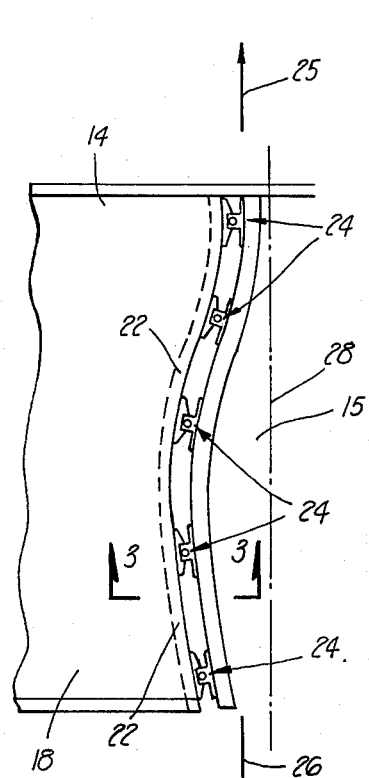
FIG. 2 is a top view of the adjustable wedge fittings secured to the sides of one of the fan duct cowls and the side of the air frame strut.

In FIG. 2, a top view of one of the fan duct cowls 14 is shown disposed adjacent to the air frame strut 15 and secured thereto by a plurality of adjustable wedge fittings designated by general reference numeral 24. The fitting 24 when attached to the side of the cowl 14 and the air frame strut 15 may be adjusted either for receiving forward thrust loads indicated by an arrow 25 or reverse thrust loads indicated by arrow 26 depending on how they are initially mounted and adjusted on the air frame structure. Also shown in this drawing is a center line 28 which represents the center line of the engine 10 disposed below the bottom of the air frame strut 15. It can be appreciated that the fitting 24 can be used equally well for vertical as well as horizontal engine and air frame strut installations.

Figure 2A:
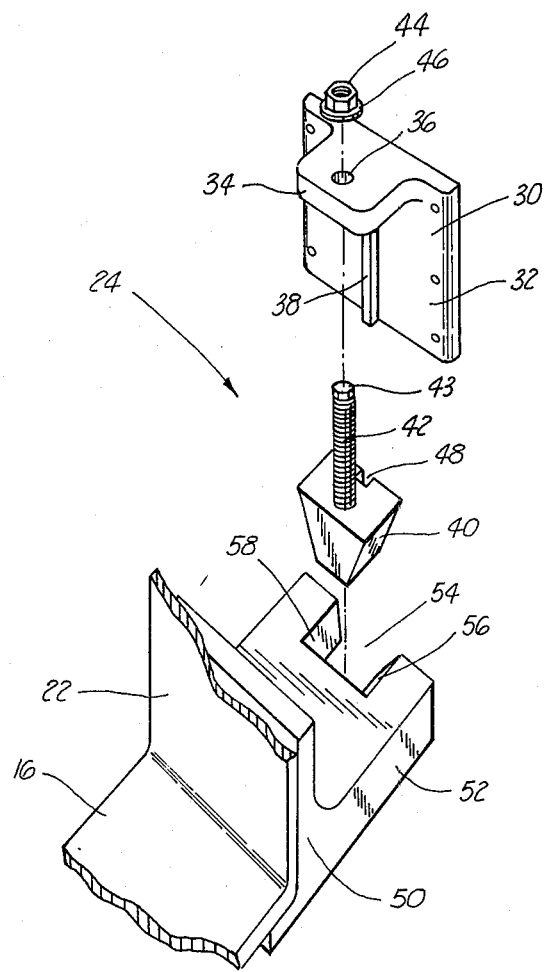
FIG. 2A is an exploded perspective view of the adjustable wedge fitting.

In FIG. 2A an exploded perspective view of the adjustable wedge fitting 24 is shown. The fitting 24 includes a bracket 30 having a flat vertical base 32 with a horizontal arm 34 integrally formed in top of the base 32 and extending outwardly therefrom. The horizontal arm 34 includes a threaded aperture 36 therein. Also extending outwardly from the front of the base 32 and along its length is an elongated guide flange 38.

In this figure a "V" shaped wedge 40 is shown with a threaded bolt 42 attached to the top of the wedge 40. The bolt 42 is threaded through the aperture 36 and attached to a safety wired locking nut 44 with a washer 46. The wedge 40 further includes a guide groove 48 which slideably receives the guide flange 38 therein. By turning the hexangular head 43 at the upper end of the wedge 40 is adjusted upwardly and downwardly on the bracket 30. It should be noted that the lower end of the bolt 42 swivels in the wedge 40. The flat vertical base 32 of the bracket 30 is attached to the side of the air frame strut 15.

Attached to the upper bifurcation wall 22 and a portion of the inner wall 16 is an "L" shaped wedge receiver 50 having an outwardly extending horizontal arm 52 integrally formed therein and having a tapered groove 54 for slideably receiving the wedge 40 therein. The groove 54 forms sides 56 and 58 in the arm 52. When the wedge 40 is lowered on the bracket 30 the wedge 40 bears against one of the sides 56 or 58 for distributing the thrust load or reverse thrust load from the engine 10 to the air frame strut 15.

FIG. 3 is a side view of the adjustable wedge 24 shown taken along line 3—3 in FIG. 2. In this view the "L" shaped wedge receiver 50 can be seen secured to the upper bifurcation wall 22 and the inner wall 16. Also the bracket 30 can be seen attached to the side of the air frame strut 15 with the wedge 40 suspended from the threaded bolt 42 which is secured to the arm 34 of the bracket 30. The wedge 40 is adjustabley received in the groove 54 of the receiver 50.

In FIG. 4 a top view of the adjustable wedge fitting 24 is shown with the wedge 40 received in the tapered groove 54 and bearing against the side 56 of the tapered groove 54. In this position the fitting 24 allows for conveying the forward thrust load indicated by the arrow 25 from the receiver 50 to the wedge 40 and then hence to the guide flange 38 and the bracket 30 attached to the strut 15.

In FIG. 4A the wedge 40 is received in the tapered groove 54 and adjusted so that the wedge 40 bears against the opposite side 58 of the tapered groove 54 for conveying the reverse thrust load from the receiver 50 to the wedge 40 and then to the guide flange 38 and the bracket 30 attached to the strut 15. A space indicated by the letter "X" in the groove 54 allows for sufficient clearance so that the receiver 50 can be disengaged laterally from the wedge 40 when the cowl 14 is opened and more importantly to provide a gap on the opposite side of the wedge 40 so that thrust loads are shared only on one side of the wedge 40.

FIG. 5 illustrates a cross section of the wedge fitting 24 taken along lines 5—5 shown in FIG. 4. In this view the wedge 40 with its tapered sides can be shown at an angle of 5 degrees from the vertical. Again in this view one side of the wedge 40 can be seen bearing against the tapered side 56 of the wedge groove 54 with the space "X" on the opposite side of the groove 54. In this view it can be seen that the lower end of bolt 42 is not threaded so that it is free to swivel in wedge 40.

It can be appreciated from reviewing FIGS. 4 and 5 that the wedge fitting 24 can be installed for either distributing thrust loads or reverse thrust loads to the strut 15. For example in FIG. 2, three of the fittings 24 can be initially installed for distributing thrust loads with the other three fittings 24 used for conveying reverse thrust loads. This is accomplished by adjusting the bracket 30 or receiver 50 when it is attached so that when the wedge 40 is lowered into the groove 54 the wedge 40 will bear against either side 56 or the opposite side 58 with the space "X" provided to release the wedge 40 laterally from the wedge receiver 50.

Changes may be made in the construction and arrangement of the parts or elements of the embodiments as described herein without departing from the spirit or scope of the invention defined in the following claims:

What is claimed is:

1. An adjustable wedge fitting for sharing the thrust load of a jet engine, the fitting adapted for mounting on an air frame strut and a fan duct cowl of a jet engine nacelle, the fitting comprising:
   a bracket adapted for attaching to the side of the air frame strut;
   a wedge attached to the bracket and vertically adjustable thereon; and
   a wedge receiver adapted for attaching to the side of the fan duct cowl, the wedge receiver having a tapered groove integrally formed therein, the wedge when lowered on the bracket received in the tapered groove of the wedge receiver.

2. The wedge fitting as described in claim 1 wherein the bracket includes a vertical base adapted for attaching to the side of the air frame strut and a horizontal arm extending outwardly from the top of the vertical base, the arm having an aperture therein, the wedge including a threaded bolt attached to and extending upwardly therefrom, the bolt threaded through the aperture in the arm and attached to a safety wired lock nut, by threading the bolt upwardly and downwardly the wedge is adjusted in the tapered groove in the wedge receiver.

3. The wedge fitting as described in claim 2 wherein the base of the bracket includes a vertical guide flange integrally formed therein, the wedge including a vertical guide groove formed in its side for receiving the guide flange so that the wedge is guided vertically on the bracket as it is raised and lowered.

4. An adjustable wedge fitting for sharing the thrust load of a jet engine, the fitting adapted for mounting an air frame strut and a fan duct cowl of a jet engine nacelle, the fitting comprising:
   a bracket having a vertical base adapted for attaching to the side of the air frame strut and a horizontal arm extending outwardly from the top of the base and having an aperture therein;
   a wedge having a threaded bolt extending upwardly therefrom the bolt threadably received through the aperture in the arm and attached to a safety wired lock nut; and
   a wedge receiver adpated for attaching to the side of the fan duct cowl, the wedge receiver having a tapered groove integrally formed therein, by the threading of the bolt upwardly and downwardly the wedge is adjusted in the tapered groove in the wedge receiver.

5. The wedge fitting as described in claim 4 wherein the wedge receiver has an "L" shaped base adapted for receipt against the side of the fan duct cowl and attached thereto, the "L" shaped base having a horizontal arm integrally formed therein and extending outwardly therefrom, the horizontal arm having the tapered groove formed therein for receiving the wedge.

* * * * *

UNITED STATES PATENT AND TRADEMARK OFFICE
CERTIFICATE OF CORRECTION

PATENT NO. : 4,283,028

DATED : August 11, 1981

INVENTOR(S) : William H. Wikle

It is certified that error appears in the above—identified patent and that said Letters Patent is hereby corrected as shown below:

On the title page, the inventor's name should read:

---- William H. Wikle ---.

Signed and Sealed this

Eighteenth Day of May 1982

[SEAL]

Attest:

Attesting Officer

GERALD J. MOSSINGHOFF

Commissioner of Patents and Trademarks